(12) United States Patent
Zhong

(10) Patent No.: US 10,517,077 B2
(45) Date of Patent: *Dec. 24, 2019

(54) METHOD AND APPARATUS FOR IMPLEMENTING MOBILE BROADBAND DEVICE SERVICE

(71) Applicant: Huawei Device (Shenzhen) Co., Ltd., Shenzhen (CN)

(72) Inventor: Zhen Zhong, Shenzhen (CN)

(73) Assignee: HUAWEI DEVICE (SHENZHEN) CO., LTD., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/969,336

(22) Filed: May 2, 2018

(65) Prior Publication Data

US 2018/0255539 A1    Sep. 6, 2018

Related U.S. Application Data

(63) Continuation of application No. 14/288,870, filed on May 28, 2014, which is a continuation of application No. PCT/CN2013/077897, filed on Jun. 25, 2013.

(30) Foreign Application Priority Data

Jun. 25, 2012 (CN) .......................... 2012 1 0209841

(51) Int. Cl.
  *H04W 72/04* (2009.01)
  *H04W 4/60* (2018.01)
  *H04L 29/08* (2006.01)
(52) U.S. Cl.
  CPC ......... *H04W 72/0406* (2013.01); *H04W 4/60* (2018.02); *H04L 67/02* (2013.01)
(58) Field of Classification Search
  CPC ........................... H04W 4/60; H04W 72/0406
  See application file for complete search history.

(56) References Cited

U.S. PATENT DOCUMENTS

2004/0098515 A1    5/2004  Rezvani et al.
2006/0073785 A1    4/2006  Klassen et al.
(Continued)

FOREIGN PATENT DOCUMENTS

CN    101374219 A    2/2009
CN    101932135 A    12/2010
(Continued)

OTHER PUBLICATIONS

Machine Translation and Abstract of Chinese Publication No. CN101374219, Feb. 25, 2009, 4 pages.
(Continued)

*Primary Examiner* — Yemane Mesfin
*Assistant Examiner* — Henry Baron
(74) *Attorney, Agent, or Firm* — Conley Rose, P.C.

(57) ABSTRACT

A method and an apparatus for implementing a mobile broadband device service. The method includes the following steps: obtaining, service information of a mobile broadband device according to a rule set on the host or by calling an application programming interface (API) of a Web server on the mobile broadband device; and when to use a corresponding function of the host for implementing a mobile broadband device service corresponding to the service information, executing, the corresponding function of the host by calling an API provided by an operating system (OS) of the host, to implement the mobile broadband device service. In the embodiments of the present disclosure limitations when the mobile broadband device is managed in the Web manner are reduced, and a capability of managing the mobile broadband device is improved.

18 Claims, 5 Drawing Sheets

(56) References Cited

U.S. PATENT DOCUMENTS

| | | |
|---|---|---|
| 2006/0242248 A1 | 10/2006 | Kokkinen |
| 2007/0032220 A1 | 2/2007 | Feher |
| 2010/0295676 A1 | 11/2010 | Khachaturov et al. |
| 2012/0209975 A1 | 8/2012 | Zong |
| 2014/0256354 A1 | 9/2014 | Zhao et al. |

FOREIGN PATENT DOCUMENTS

| | | |
|---|---|---|
| CN | 102158350 A | 8/2011 |
| CN | 102209111 A | 10/2011 |
| CN | 102361510 A | 2/2012 |
| CN | 102790800 A | 11/2012 |
| EP | 1530323 A1 | 5/2005 |
| EP | 2146475 A1 | 1/2010 |

OTHER PUBLICATIONS

Machine Translation and Abstract of Chinese Publication No. CN101932135, Dec. 29, 2010, 8 pages.

Machine Translation and Abstract of Chinese Publication No. CN102209111, Oct. 5, 2011, 10 pages.

Machine Translation and Abstract of Chinese Publication No. CN102361510, Feb. 22, 2012, 8 pages.

Machine Translation and Abstract of Chinese Publication No. CN102790800, Nov. 21, 2012, 14 pages.

Machine Translation and Abstract of European Publication No. EP1530323, May 11, 2005, 5 pages.

Foreign Communication From A Counterpart Application, Chinese Application No. 201210209841.4, Chinese Office Action dated Jun. 3, 2014, 8 pages.

Foreign Communication From A Counterpart Application, European Application No. 13810709.9, Extended European Search Report dated May 27, 2015, 6 pages.

Foreign Communication From A Counterpart Application, Japanese Application No. 2014-553607, Japanese Office Action dated Jul. 28, 2015, 2 pages.

Foreign Communication From A Counterpart Application, Japanese Application No. 2014-553607, English Translation of Japanese Office Action dated Jul. 28, 2015, 2 pages.

Foreign Communication From A Counterpart Application, PCT Application No. PCT/CN2013/077897, English Translation of International Search Report dated Oct. 10, 2013, 2 pages.

Foreign Communication From A Counterpart Application, PCT Application No. PCT/CN2013/077897, English Translation of Written Opinion dated Oct. 10, 2013, 10 pages.

METHOD AND APPARATUS FOR IMPLEMENTING MOBILE BROADBAND DEVICE SERVICE

CROSS-REFERENCE TO RELATED APPLICATIONS

This application is a continuation of U.S. application Ser. No. 14/288,870, filed on May 28, 2014, which is a continuation of International Application No. PCT/CN2013/077897, filed on Jun. 25, 2013, which claims priority to Chinese Patent Application No. 201210209841.4, filed on Jun. 25, 2012. All of the aforementioned patent applications are hereby incorporated by reference in their entireties.

TECHNICAL FIELD

The present disclosure relates to the field of mobile broadband (MBB) technologies, and in particular, to a method and an apparatus for implementing a mobile broadband device service.

BACKGROUND

In recent years, with the booming of MBB technologies, mobile broadband devices, as terminal devices thereof, have also witnessed unprecedented development. A 3rd-generation (3G) data card and a 3G Universal Serial Bus (USB) Modem are most typical.

Currently, a mobile broadband device is managed correspondingly to implement dial-up access, short message, and phone book services of the mobile broadband device and the like. The mobile broadband device may be managed by host client software that matches the mobile broadband device, for example, Personal Computer (PC) client software. However, in the management of mobile broadband devices, host Operating Systems (OSs) are not unified, almost every type of OS platform has its own particular development platform and programming language, and the host client software cannot be compatible with OS platforms of all types. Therefore, cross-platform support cannot be implemented on the client if the mobile broadband device is managed by using the host client software.

In the prior art, there is a method for managing the mobile broadband device in a Web manner, so that the host can manage the mobile broadband device without the client software, thereby solving a problem of cross-platform support of the client. Regarding the management in the Web manner, an embedded Web server is integrated into the mobile broadband device, a Web management page is embedded to receive a management command of a user, and the Web server executes a corresponding management command flow, so as to implement a mobile broadband device service corresponding to the management command. Further, the Web server may be used to view corresponding service information.

During implementation of the present disclosure, the inventors find that because the management in the Web manner is a management manner based on a web page, if the mobile broadband device is detached from the Web management page, that is, the host does not use a browser to open the Web management page of the mobile broadband device to manage the mobile broadband device, some services such as a reminder-type service cannot be implemented. In addition, for security concern and the like, calling a part of functions of the host by web page management is limited at the beginning of a design of the web page management. Therefore, there are a lot of limitations when the mobile broadband device is managed in the Web manner.

SUMMARY

In view of this, embodiments of the present disclosure provide a method and a host apparatus for implementing a mobile broadband device service, so as to reduce limitations when a mobile broadband device is managed in a Web manner.

In order to achieve the above objective, the present disclosure provides the following technical solutions.

A method for implementing a mobile broadband device service is provided, where a host is connected to a mobile broadband device, and the method includes obtaining, by the host, service information of the mobile broadband device according to a rule set on the host or by calling an application programming interface (API) of a Web server on the mobile broadband device; and if a corresponding function of the host is to be used for implementing a mobile broadband device service corresponding to the service information, executing, by the host, the corresponding function of the host by calling an API provided by an OS of the host, to implement the mobile broadband device service.

If the corresponding function of the host is not to be used for implementing the mobile broadband device service corresponding to the service information, the host calls the API of the Web server on the mobile broadband device to implement the mobile broadband device service.

The calling the API of the Web server includes calling a Hypertext Transfer Protocol (HTTP) API or a socket interface of the Web server.

The mobile broadband device service includes a reminder service; and the executing the corresponding function of the host includes executing a reminder function of the host, and displaying reminder information in the reminder-type service information on the host.

The mobile broadband device service includes a network adaptation service; and the executing the corresponding function of the host by calling an API provided by an OS of the host includes obtaining nearby Wireless Fidelity (Wi-Fi) network information by calling a Wi-Fi API of the OS of the host, comparing mobile broadband service information with the Wi-Fi network information, determining a current adaptive network according to a preset network adaptation standard, and establishing a network connection with the current adaptive network.

An embodiment of the present disclosure further provides an apparatus for implementing a mobile broadband device service, where a host is connected to a mobile broadband device, and the apparatus includes a service information obtaining module configured to obtain service information of the mobile broadband device according to a rule set on the host or by calling an API of a Web server on the mobile broadband device; a judging module configured to determine whether a corresponding function of the host is to be used for implementing a mobile broadband device service corresponding to the service information; and a service implementation module configured to execute, if the corresponding function of the host is to be used for implementing the mobile broadband device service corresponding to the service information, the corresponding function of the host by calling an API provided by an OS of the host, to implement the mobile broadband device service.

The service implementation module is further configured to call, by the host, if the corresponding function of the host is not to be used for implementing the mobile broadband device service corresponding to the service information, the API of the Web server on the mobile broadband device to implement the mobile broadband device service.

The API of the Web server includes a HTTP API or a socket interface of the Web server.

The judging module includes a correspondence storage unit configured to store preset correspondence among the service information of the mobile broadband device, the mobile broadband device service, and the host function that needs to be called; and a collaboration judging unit configured to determine, according to the correspondence stored by the correspondence storage unit, whether the corresponding function of the host is to be used for implementing the mobile broadband device service corresponding to the service information.

The collaboration judging unit includes a first determining subunit configured to determine, when the service information obtained by the service information obtaining module is reminder-type service information, and there is a new reminder in the reminder-type service information, whether to call a reminder function of the host for implementing a reminder-type service; and the service implementation module includes a first executing unit configured to execute the reminder function of a host by calling an OS API of the host, and display reminder information in the reminder-type service information on the host, to implement a reminder service of the mobile broadband device.

The collaboration judging unit includes a second determining subunit configured to determine, when the service information obtained by the service information obtaining module is network adaptation service information, whether to call a Wi-Fi function of the host for implementing the mobile broadband device service corresponding to mobile broadband service information; and the service implementation module includes a second executing unit configured to obtain nearby Wi-Fi network information by calling an OS Wi-Fi API provided by the OS of the host, compare the mobile broadband service information with the Wi-Fi network information, determine a current adaptive network according to a preset network adaptation standard, and establish a network connection with the current adaptive network.

Based on the above technical solutions, in the method for implementing a mobile broadband device service according to the embodiments of the present disclosure, both the API of the Web server and the API of the host can be called. The corresponding function of the host is selected and called by determining whether to collaboratively use the corresponding function of the host for implementing the mobile broadband device service corresponding to the service information, and the mobile broadband device service is implemented by using the host function. In the embodiments of the present disclosure, a mobile broadband device service that cannot be implemented in an existing Web manner is implemented by a host by using a collaboration function of the host, limitations when the mobile broadband device is managed in the Web manner are reduced, and a capability of managing the mobile broadband device is improved.

BRIEF DESCRIPTION OF DRAWINGS

To describe the technical solutions in the embodiments of the present disclosure more clearly, the following briefly introduces the accompanying drawings used for describing the embodiments. The accompanying drawings in the following description show merely some embodiments of the present disclosure, and a person of ordinary skill in the art may still derive other drawings from these accompanying drawings without creative efforts.

DESCRIPTION OF EMBODIMENTS

Based on an existing technology for managing a mobile broadband device in a Web manner, embodiments of the present disclosure are intended to collaboratively use a corresponding host function based on the prior art, so that a mobile broadband device service that cannot be implemented in the existing Web manner is implemented by the host. The inventors develop a piece of collaboration software at the host, and use the collaboration software to implement calling of an API of a Web server and calling of an OS API at the host. Further, a calling rule of the API of the host is set so that the host and the mobile broadband device cooperate with each other. Therefore, a defect when the mobile broadband device is managed in the Web manner is resolved, limitations when the mobile broadband device is managed in the Web manner are reduced, and a capability of managing the mobile broadband device is improved.

The following clearly describes the technical solutions in the embodiments of the present disclosure with reference to the accompanying drawings in the embodiments of the present disclosure. The described embodiments are merely a part rather than all of the embodiments of the present disclosure. All other embodiments obtained by a person of ordinary skill in the art based on the embodiments of the present disclosure without creative efforts shall fall within the protection scope of the present disclosure.

Figure 1:
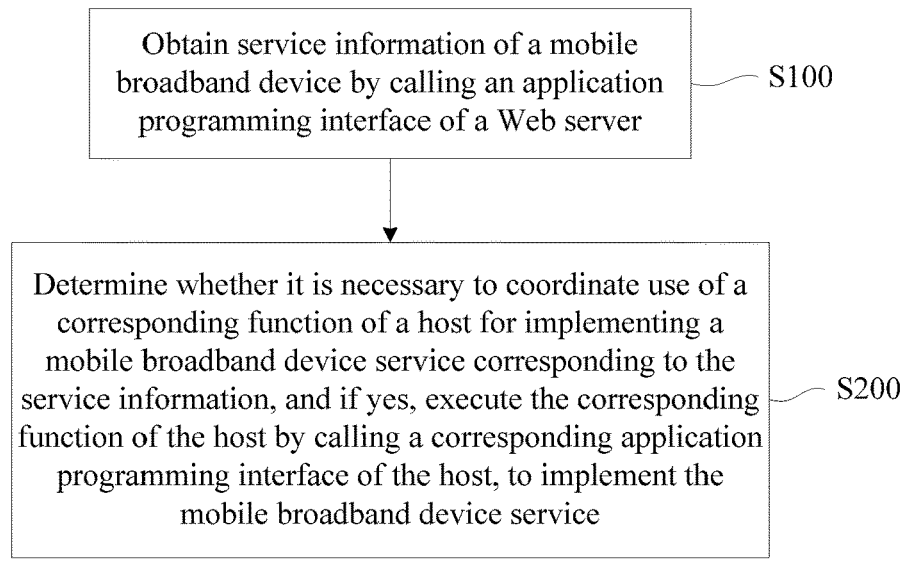
FIG. 1 is a flowchart of a method for implementing a mobile broadband device service according to an embodiment of the present disclosure.

FIG. 1 is a flowchart of a method for implementing a mobile broadband device service according to an embodiment of the present disclosure. Referring to FIG. 1, the method may include the following steps.

Step S100: Obtain service information of a mobile broadband device by calling an API of a Web server.

A host apparatus may obtain the service information of the mobile broadband device by calling the API of the Web server. The host apparatus may call the API of the Web server by using a collaboration software program installed on the host apparatus. The host apparatus may be a user terminal device such as a PC, a mobile phone, a Personal Digital Assistant (PDA), and a tablet computer.

The API of the Web server may be any programmable interface, including a conventional AT command, a socket interface, a serial port, a USB port, Bluetooth, infrared, Wi-Fi, or a network-interface-based HTTP API. The Web server may be an embedded Web Server integrated into the mobile broadband device, and a Web management page is embedded therein. A user can manage a data card only by opening this page by using a browser on the host apparatus.

The obtained service information of the mobile broadband device may include service information included by a mobile broadband device service that cannot be implemented by the existing technology for managing the mobile broadband device in a Web manner, for example, reminder-type service information (such as a short message reminder and an email reminder), mobile broadband service information (such as 3G service information and $4^{th}$ generation (4G) service information), and phone book service information, and may also include designated service information included by a mobile broadband device service that cannot be implemented by the prior art. The obtained service information of the mobile broadband device may be determined according to a practical application or a user requirement, and is not limited by the present disclosure.

Optionally, step S100 may be executed by a processor of the host apparatus.

Step S200: Determine whether to collaboratively use a corresponding function of the host for implementing a mobile broadband device service corresponding to the service information, and if yes, execute the corresponding function of the host by calling a corresponding API of the host, to implement the mobile broadband device service.

Optionally, correspondence among the service information of the mobile broadband device, the mobile broadband device service, and the host function that needs to be called may be preset, and whether to collaboratively use the corresponding function of the host for implementing the mobile broadband device service corresponding to the service information is determined by using the preset correspondence among the three, where the corresponding mobile broadband device service may be determined by using the service information of the mobile broadband device obtained in step S100. For example, the reminder-type service information, such as a short message reminder and an email reminder, corresponds to a reminder service, and the mobile broadband service information, such as, 3G service information and 4G service information, corresponds to a network adaptation service. For a situation where a type of service information corresponds to multiple types of mobile broadband device services, the mobile broadband device services may be set correspondingly according to a practical application or a user requirement. The host function that needs to be called is an indispensable function for implementing the corresponding mobile broadband device service. For example, the reminder service needs to call a reminder function of the host, and the network adaptation service needs to call a Wi-Fi function of the host, so as to implement switching between mobile broadband and Wi-Fi.

After obtaining the service information in step S100, the host apparatus calls the preset correspondence among the service information of the mobile broadband device, the mobile broadband device service, and the host function that needs to be called, and searches for the mobile broadband device service corresponding to the obtained service information and the corresponding host function that needs to be collaboratively used. If a correspondence combination of the obtained service information, the corresponding mobile broadband device service, and the corresponding host function that needs to be collaboratively used can be found from the preset correspondence among the three, it is determined whether to collaboratively use a corresponding function of the host for implementing the mobile broadband device service corresponding to the service information obtained in step S100. The host apparatus calls the corresponding API of the host to execute the corresponding function by using the host OS, thereby implementing the mobile broadband device service.

Optionally, if the obtained service information cannot be found from the correspondence, or it is unnecessary to call the host function to find the mobile broadband device service corresponding to the obtained service information, the mobile broadband device service is implemented directly without calling the host function. For a specific method for implementing the mobile broadband device service directly, reference may be made to the existing technology for managing the mobile broadband device in a Web manner.

Optionally, the correspondence among the service information of the mobile broadband device, the mobile broadband device service, and the host function that needs to be called may be stored in the host apparatus in the form of a list.

Optionally, on the basis of the preset correspondence among the service information of the mobile broadband device, the mobile broadband device service, and the host function that needs to be called, a current working state of the mobile broadband device may further be added to form correspondence among the current working state of the mobile broadband device, the service information of the mobile broadband device, the mobile broadband device service, and the host function that needs to be called, where the current working state of the mobile broadband device includes the following. The mobile broadband device is detached from a Web management page and the mobile broadband device is accessing a Web management page. That the mobile broadband device is detached from the Web management page indicates that the user is not using a browser to open the Web management page on the host apparatus to manage the mobile broadband device. That the mobile broadband device is accessing the Web management page indicates that the user is using the browser to open the Web management page on the host apparatus to manage the mobile broadband device. Whether to collaboratively use a corresponding function of the host for the mobile broadband device in the current working state to implement the mobile broadband device service corresponding to the service information is determined according to the correspondence among the four. For example, it is determined whether to call the reminder function of the host for a reminder-type service in the working state in which the mobile broadband device is detached from the Web management page, and it is determined that the reminder function of the host is not called for a reminder-type service in the working state in which the mobile broadband device is accessing the Web management page, and that the reminder-type service is directly implemented in an existing Web manner.

Optionally, step S200 may be executed by a processor of the host apparatus.

FIG. 1 shows a method for implementing a mobile broadband device service according to an embodiment, where both the API of the Web server and the API of the host can be called. The corresponding function of the host is selected and called by determining whether to collaboratively use the corresponding function of the host for implementing the mobile broadband device service corresponding to the service information, and the mobile broadband device service is implemented by using the host function. In the embodiment of the present disclosure, a mobile broadband device service that cannot be implemented in the existing Web manner is implemented by the host by using a collaboration function of the host. Therefore, a defect when the mobile broadband device is managed in the Web manner is resolved, and all services of the mobile broadband device are implemented.

In the existing technology for managing the mobile broadband device in the Web manner, there are many mobile broadband device services that can be hardly implemented, for example, calling of a camera and calling of a headset, but the reminder-type service detached from the Web management page and a resource access-type service of the host are most typical. The resource access-type service of the host includes, for example, access to a Wi-Fi function of the host. The specific technical solutions for implementing the mobile broadband device service according to the embodiments of the present disclosure will be described hereinafter with reference to the two typical types of mobile broadband device services that can be hardly implemented in the existing technology for managing the mobile broadband device in the Web manner, where the resource access-type service of the host is described by using a network adaptation service. For ease of description, the API of the Web server mentioned hereinafter is an HTTP API.

Figure 2:
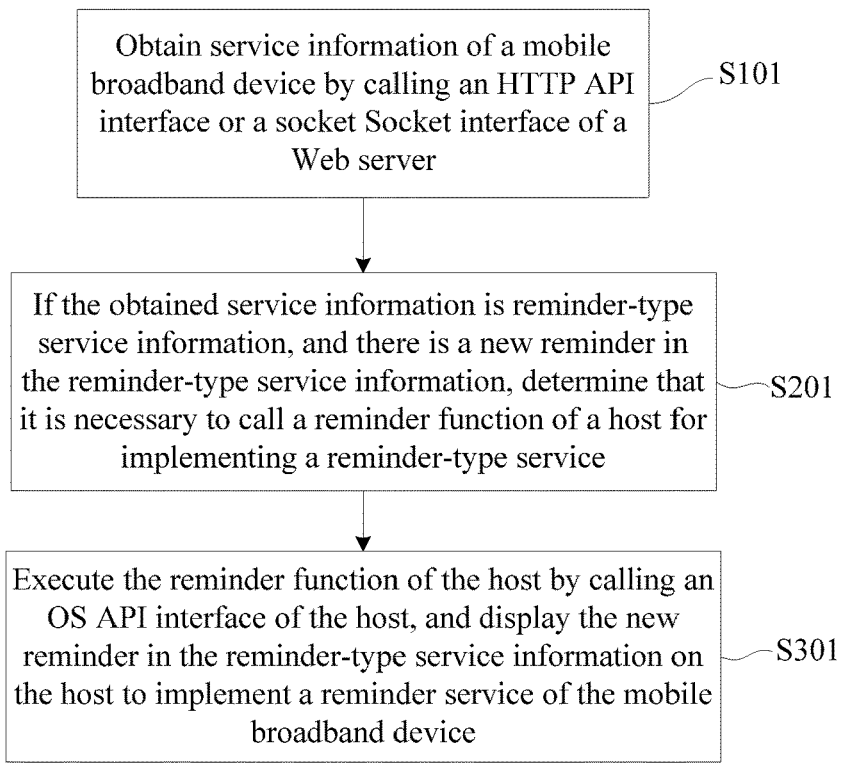
FIG. 2 is a flowchart of a method for implementing a reminder-type service of a mobile broadband device according to an embodiment of the present disclosure.

FIG. 2 is a flowchart of a method for implementing a reminder-type service of a mobile broadband device according to an embodiment of the present disclosure. Referring to FIG. 2, the method may include the following steps.

Step S101: Obtain service information of a mobile broadband device by calling an HTTP API or a socket interface of a Web server.

Step S201: If the obtained service information is reminder-type service information, and there is a new reminder in the reminder-type service information, determine whether to call a reminder function of a host for implementing a reminder-type service.

When the obtained service information is the reminder-type service information, it is determined that a corresponding mobile broadband device service is a reminder-type service, and when there is a new reminder in the obtained reminder-type service information, it is determined whether to call the reminder function of the host for implementing the reminder-type service corresponding to the reminder-type service information.

Step S301: Execute the reminder function of the host by calling an OS API of the host, and display the new reminder in the reminder-type service information on the host to implement a reminder service of the mobile broadband device.

Optionally, correspondence among the reminder-type service information, the reminder service of the mobile broadband device, and the reminder function of the host may be preset.

Executing the reminder function of the host and displaying the new reminder in the reminder-type service information on the host to implement a reminder service of the mobile broadband device may be displaying a message prompt box on an OS interface of the host by using a tray icon function of the host OS, and displaying the new reminder in the reminder-type service information in the message prompt box to implement the reminder service of the mobile broadband device.

Optionally, correspondence among the reminder-type service information, the reminder-type service of the mobile broadband device, a working state in which the mobile broadband device is detached from the Web management page, and the reminder function of the host may be preset. Step S201 further includes determining whether a current working state of the mobile broadband device corresponds to the working state of the mobile broadband device in the preset correspondence among the four, and if yes, calling the reminder function of the host.

Figure 3:
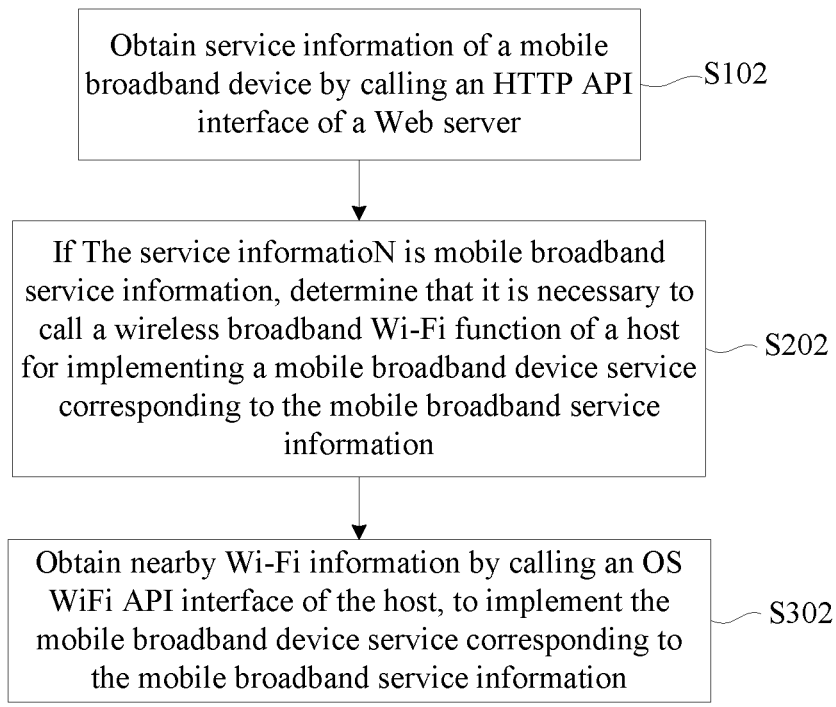
FIG. 3 is a flowchart of a method for implementing a network adaptation service of a mobile broadband device according to an embodiment of the present disclosure.

FIG. 3 is a flowchart of a method for implementing a network adaptation service of a mobile broadband device according to an embodiment of the present disclosure. Referring to FIG. 3, the method may include the following steps.

Step S102: Obtain service information of a mobile broadband device by calling an HTTP API of a Web server.

Step S202: If the service information is mobile broadband service information, determine whether to call a wireless broadband Wi-Fi function of a host for implementing a mobile broadband device service corresponding to the mobile broadband service information.

If the service information is the mobile broadband service information, it is determined that the corresponding mobile broadband device service is a network adaptation service, and whether to call the wireless broadband Wi-Fi function of the host for implementing the network adaptation service.

Step S302: Obtain nearby Wi-Fi information by calling an OS Wi-Fi API of the host, to implement the mobile broadband device service corresponding to the mobile broadband service information.

The nearby Wi-Fi information is obtained by calling the OS Wi-Fi API of the host, the mobile broadband service information is compared with the Wi-Fi information, a current adaptive network is determined according to a preset network adaptation standard, and a network connection is established with the current adaptive network.

Optionally, correspondence among the mobile broadband service information, the network adaptation service, and the host Wi-Fi function may be preset. After the mobile broadband service information is obtained, the host Wi-Fi function is directly called to implement the network adaptation service of the mobile broadband device.

The mobile broadband service information may be 3G service information or 4G service information; and the 3G service information may include current 3G signal strength and an operator name. The mobile broadband service information that can be obtained by calling an HTTP 3G API of the Web server is the 3G service information.

The nearby Wi-Fi information can be obtained by calling the host Wi-Fi function and searching for a nearby Wi-Fi hotspot, signal strength, and the like. According to the mobile broadband service information and the Wi-Fi information, the current adaptive network is determined by using the preset network adaptation standard, and a network connection is established with the adaptive network. Therefore, a network adaptation task of the mobile broadband device can be implemented.

A problem of accessing a host resource, such as a camera function and a headset function, which cannot be implemented by the existing technology for managing the mobile broadband device in a Web manner, can be implemented by collaboratively using a corresponding host function based on the principle disclosed in the present disclosure. For specific implementation methods, reference may be made to each other, and details will not be described herein again.

Figure 4:
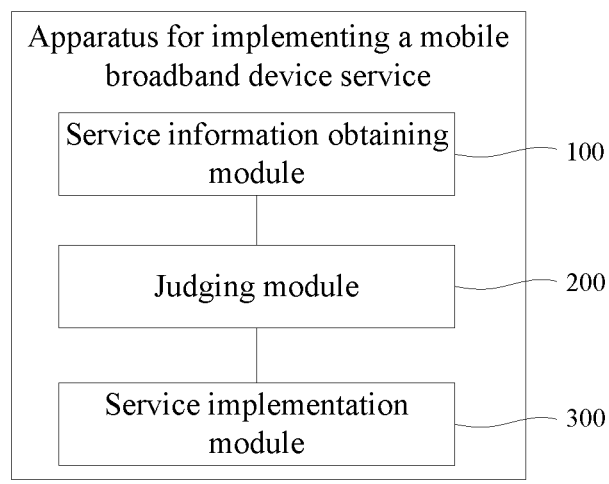
FIG. 4 is a structural block diagram of an apparatus for implementing a mobile broadband device service according to an embodiment of the present disclosure.

FIG. 4 is a structural block diagram of an apparatus for implementing a mobile broadband device service according to an embodiment of the present disclosure. Referring to FIG. 4, the apparatus for implementing a mobile broadband device service may be a host apparatus, including a user terminal device such as a PC, a mobile phone, a PDA, and a tablet computer. The apparatus for implementing a mobile broadband device service may include a service information obtaining module 100, a judging module 200, and a service implementation module 300.

The service information obtaining module 100 is configured to obtain service information of a mobile broadband device by calling an API of a Web server.

The host apparatus may call the API of the Web server in real time or periodically to obtain current service information of the mobile broadband device, and may also obtain the service information of the mobile broadband device according to a rule set by a user.

The API of the Web server may be any programmable interface, including a conventional AT command, a socket interface, a serial port, a USB port, Bluetooth, infrared, Wi-Fi, or a network-interface-based HTTP API. The Web server may be an embedded Web Server integrated into the mobile broadband device, and a Web management page is embedded therein. The user can manage a data card only by opening this page by using a browser on the host apparatus.

The judging module 200 is configured to determine whether to collaboratively use a corresponding function of the host for implementing a mobile broadband device service corresponding to the service information obtained by the service information obtaining module 100.

After obtaining the service information of the mobile broadband device, the host apparatus determines whether to collaboratively use a corresponding function of its own for implementing the mobile broadband device service corresponding to the service information.

Figure 5:
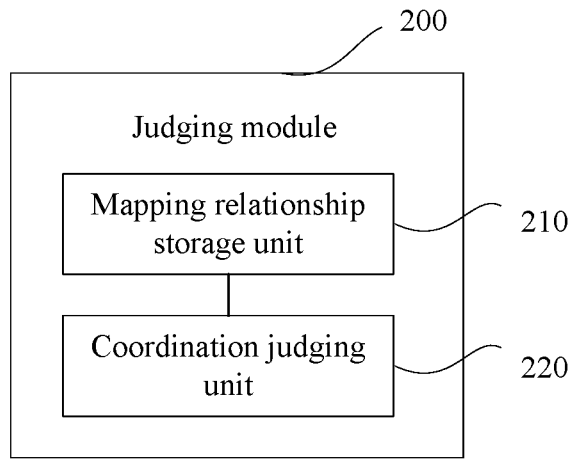
FIG. 5 is a structural block diagram of a judging module according to an embodiment of the present disclosure.

For a structure of the judging module 200, reference may be made to FIG. 5, and the judging module 200 includes a mapping relationship storage unit 210 (also called a correspondence storage unit) configured to store preset correspondence among the service information of the mobile broadband device, the mobile broadband device service, and the host function that needs to be called; and a coordination judging unit 220 (also called a collaboration judging unit) configured to determine, according to the correspondence among the three stored by the mapping relationship storage unit 210, whether to collaboratively use the corresponding function of the host for implementing the mobile broadband device service corresponding to the service information.

Figure 6:
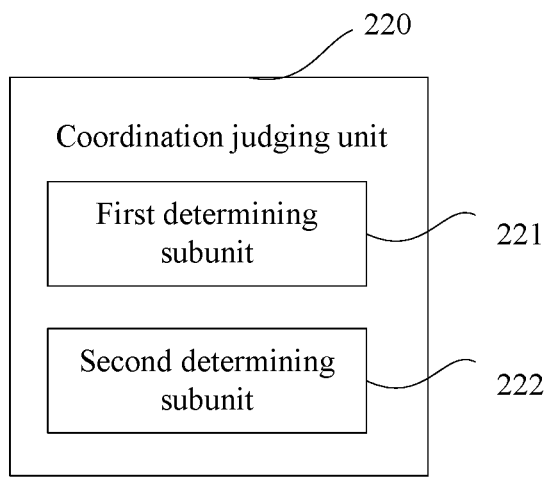
FIG. 6 is a structural block diagram of a coordination judging unit according to an embodiment of the present disclosure.

FIG. 6 is a structural block diagram of the coordination judging unit 220. Referring to FIG. 6, the coordination judging unit 220 may include a first determining subunit 221 and a second determining subunit 222.

The first determining subunit 221 is configured to determine, when the service information obtained by the service information obtaining module 100 is reminder-type service information, and there is a new reminder in the reminder-type service information, whether to call a reminder function of the host for implementing a reminder-type service.

When the service information obtained by the service information obtaining module 100 is the reminder-type service information, and there is a new reminder in the reminder-type service information, the first determining subunit 221 determines that the corresponding mobile broadband device service is the reminder-type service, and whether to call the reminder function of the host for implementing the reminder-type service.

The second determining subunit 222 is configured to determine, when the service information obtained by the service information obtaining module 100 is mobile broadband service information, whether to call a wireless broadband Wi-Fi function of the host for implementing the mobile broadband device service corresponding to the mobile broadband service information.

When the service information obtained by the service information obtaining module 100 is the mobile broadband service information, it is determined that the corresponding mobile broadband device service is a network adaptation service, and whether to call the wireless broadband Wi-Fi function of the host for implementing the network adaptation service.

The mobile broadband service information may be 3G service information or 4G service information; and the 3G service information may include current 3G signal strength and an operator name. The mobile broadband service information that can be obtained by calling an HTTP 3G API of the Web server is the 3G service information.

The service implementation module 300 is configured to execute, in a case where a judgment result of the judging module 200 is yes, the corresponding function of the host by calling a corresponding API of the host, to implement the mobile broadband device service.

After determining whether to collaboratively use a corresponding function of its own for implementing the mobile broadband device service corresponding to the service information, the host apparatus calls the corresponding function of its own to implement the mobile broadband device service.

Figure 7:
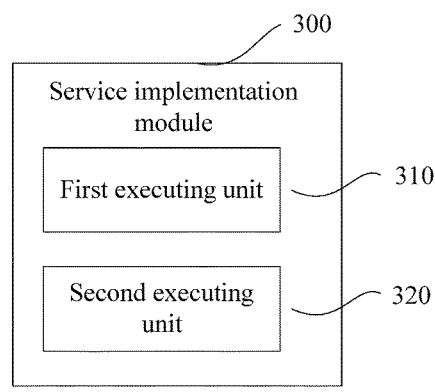
FIG. 7 is a structural block diagram of a service implementation module according to an embodiment of the present disclosure.

FIG. 7 shows a structural block diagram of the service implementation module 300 corresponding to FIG. 6, where the service implementation module 300 includes a first executing unit 310 configured to execute, after the first determining subunit 211 determines whether to call the reminder function of the host, the reminder function of the host by calling an OS API of the host, and display the new reminder in the reminder-type service information on the host to implement a reminder service of the mobile broadband device; and a second executing unit 320 configured to obtain, after the second determining subunit 222 determines whether to call the host Wi-Fi function, nearby Wi-Fi information by calling an OS Wi-Fi API of the host, to implement the mobile broadband device service corresponding to the mobile broadband service information.

The second executing unit 320 may obtain the nearby Wi-Fi information by calling the OS Wi-Fi API of the host, compare the mobile broadband service information with the Wi-Fi information, determine a current adaptive network according to a preset network adaptation standard, and establish a network connection with the adaptive network.

Optionally, the mapping relationship storage unit 210 may be further configured to store preset correspondence among the current working state of the mobile broadband device, the service information of the mobile broadband device, the mobile broadband device service, and the host function that needs to be called.

Optionally, the coordination judging unit 220 may be further configured to determine, according to the correspondence among the four stored by the mapping relationship storage unit 210, whether to collaboratively use the corresponding function of the host for the mobile broadband device in a current working state to implement the mobile broadband device service corresponding to the service information. For example, it is determined whether to call the reminder function of the host for a reminder-type service in the working state in which the mobile broadband device is detached from the Web management page, and it is determined that the reminder function of the host is not called for a reminder-type service in the working state in which the mobile broadband device is accessing the Web management page, and that the reminder-type service is directly implemented in an existing Web manner.

Figure 8:
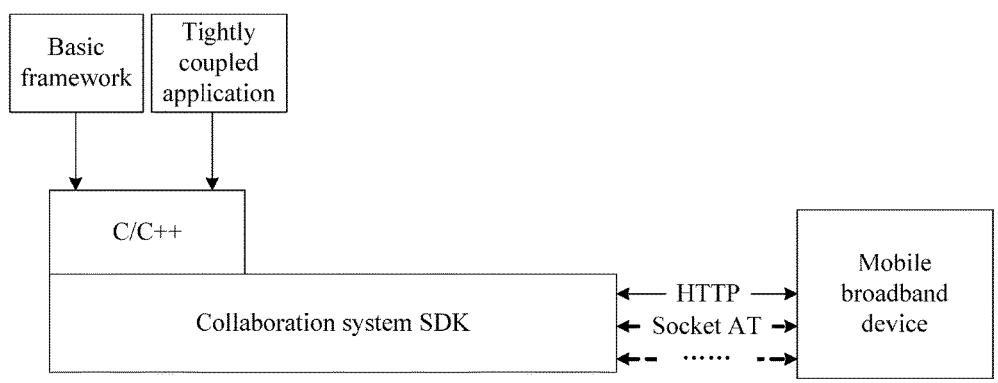
FIG. 8 is a software structural diagram of a system for implementing a mobile broadband device service according to an embodiment of the present disclosure.

It should be noted that, the apparatus for implementing a mobile broadband device service as shown in the embodiment of the present disclosure may be the host apparatus installed with the collaboration software provided by the embodiment of the present disclosure. For the function implemented by the collaboration software, reference may be to the method for implementing a mobile broadband device service as shown in the embodiment of the present disclosure. A specific software architecture of the collaboration software provided by the embodiment of the present disclosure is shown hereinafter, to make the method and the apparatus for implementing a mobile broadband device service according to the embodiments of the present disclosure clearer. Referring to FIG. 8, the software architecture may include a basic framework, a tightly coupled application, and a collaboration system Software Development Kit (SDK).

The tightly coupled application mainly refers to an application which has a close relationship with the mobile broadband device service, for example, a reminder-type service and a network adaptation service. This type of application can be implemented by calling a C/C++ interface provided by the collaboration system SDK for the application during programming, and definitely can be implemented by calling other interfaces.

Figure 9:
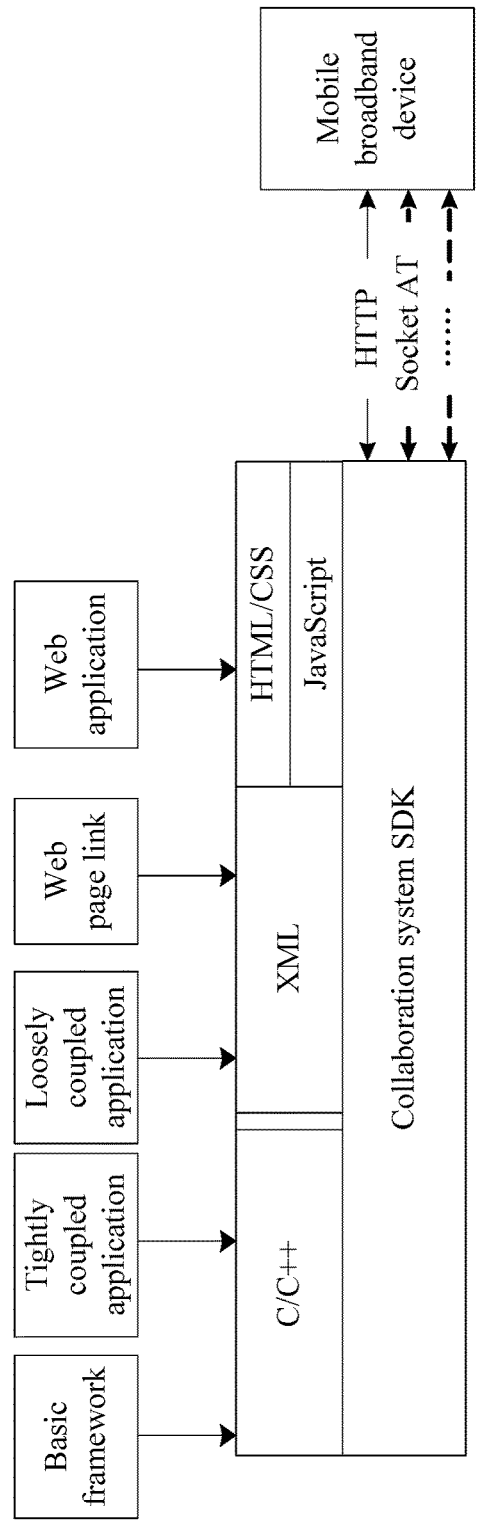
FIG. 9 is another software structural diagram of a system for implementing a mobile broadband device service according to an embodiment of the present disclosure.

FIG. 9 shows another software structural diagram of a system for implementing a mobile broadband device service according to the present disclosure. Compared with FIG. 8, FIG. 9 further includes a loosely coupled application, a web page link, and a Web application.

The loosely coupled application mainly refers to an application that does not have a close relationship with the mobile broadband device service. For example, a web browser may be integrated into the loosely coupled application. Because a direct relationship between this type of application and the mobile broadband device is not obvious, a file path and a command line parameter and so on of the application can be configured only by using an Extensible Markup Language (XML) during programming without calling the C/C++ interface, and definitely, other interfaces can also be used.

The web page link can also be configured by using the XML.

The Web application is similar to the tightly coupled application, but the programming thereof is a Web manner. The application may be programmed by using an HyperText Markup Language (HTML)/JavaScript interface provided by the system SDK. A purpose of setting the application is merely maintaining consistent user experience with a Web management solution of the mobile broadband device.

The embodiments in the specification are described in a progressive manner. Each embodiment emphasizes differences from other embodiments, and reference may be made to each other for the same or similar parts of the embodiments. Because the apparatus disclosed in the embodiments corresponds to the method disclosed in the embodiments, their descriptions are simple, and for relevant parts of the descriptions, reference may be made to the method.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

The steps of the method or algorithm described with reference to the embodiments disclosed herein may be implemented using hardware, a software program executed by a processor, or a combination thereof. The software module may be placed in a random access memory (RAM), a memory, a read-only memory (ROM), an electrically programmable ROM, an electrically erasable programmable ROM, a register, a hard disk, a removable magnetic disk, a compact disc-ROM (CD-ROM), or a storage medium of any other form well-known in the art.

Based on the foregoing descriptions of the disclosed embodiments, a person skilled in the art can implement or use the present disclosure. Multiple modifications of the embodiments are obvious for a person skilled in the art, and the general principle defined in the specification can be implemented in other embodiments without departing from the spirit and scope of the present disclosure. Therefore, the present disclosure will not be limited to the embodiments shown in the specification, but should be accorded the widest scope consistent with the principles and novel features disclosed in the specification.

What is claimed is:

1. A method for implementing a mobile broadband device service, comprising:
    obtaining, by a host in communication with a mobile broadband device, service information of the mobile broadband device by calling an application programming interface (API) of a Web server on the mobile broadband device;
    calling, by the host, a reminder function of the host for implementing a reminder-type service when the service information is reminder-type service information including a new reminder;
    executing the reminder function of the host by calling an operating system (OS) API of the host; and
    displaying the new reminder in the reminder-type service information on the host.

2. The method of claim 1, wherein executing the reminder function of the host and displaying the new reminder comprises:
    displaying a message prompt box on an OS interface of the host; and
    displaying the new reminder in the reminder-type service information in the message prompt box.

3. The method of claim 1, wherein the Web server is an embedded Web server integrated into the mobile broadband device and is embedded a Web management page.

4. The method of claim 1, wherein the API of the Web server comprises a Hypertext Transfer Protocol (HTTP) API.

5. The method of claim 1, wherein the API of the Web server comprises a socket interface of the Web server.

6. The method of claim 1, wherein the reminder function of the host is to be used for implementing the mobile broadband device service corresponding to the service information, and wherein the mobile broadband device service is implemented directly without calling the reminder function.

7. A host for implementing a mobile broadband device service, comprising:
- a transceiver configured to communicate with a mobile broadband device;
- a memory storing a plurality of applications and one or more programs; and
- one or more processors coupled to the transceiver and the memory, wherein the one or more processors are configured to execute the one or more programs to cause the host to:
  - obtain service information of the mobile broadband device by calling an application programming interface (API) of a Web server on the mobile broadband device;
  - call a reminder function of the host for implementing a reminder-type service when the service information is reminder-type service information including a new reminder;
  - execute the reminder function of the host by calling an operating system (OS) API of the host; and
  - display the new reminder in the reminder-type service information on the host.

8. The host of claim 7, wherein executing the reminder function of the host and displaying the new reminder comprises:
- displaying a message prompt box on an OS interface of the host; and
- displaying the new reminder in the reminder-type service information in the message prompt box.

9. The host of claim 7, wherein the Web server is an embedded Web server integrated into the mobile broadband device and is embedded a Web management page.

10. The host of claim 7, wherein the API of the Web server comprises a Hypertext Transfer Protocol (HTTP) API.

11. The host of claim 7, wherein the API of the Web server comprises a socket interface of the Web server.

12. The host of claim 7, wherein the reminder function of the host is to be used for implementing the mobile broadband device service corresponding to the service information, and wherein the mobile broadband device service is implemented directly without calling the reminder function.

13. A non-volatile memory comprising one or more programs that are configured to be executed by one or more processors, the one or more programs including instructions for:
- obtaining service information of a mobile broadband device by calling an application programming interface (API) of a Web server on the mobile broadband device;
- calling a reminder function of a host for implementing a reminder-type service when the service information is reminder-type service information including a new reminder;
- executing the reminder function of the host by calling an operating system (OS) API of the host; and
- displaying the new reminder in the reminder-type service information on the host.

14. The non-volatile memory of claim 13, wherein executing the reminder function of the host and displaying the new reminder comprises:
- displaying a message prompt box on an OS interface of the host; and
- displaying the new reminder in the reminder-type service information in the message prompt box.

15. The non-volatile memory of claim 13, wherein the Web server is an embedded Web server integrated into the mobile broadband device and is embedded a Web management page.

16. The non-volatile memory of claim 13, wherein the API of the Web server comprises a Hypertext Transfer Protocol (HTTP) API.

17. The non-volatile memory of claim 13, wherein the API of the Web server comprises a socket interface of the Web server.

18. The non-volatile memory of claim 13, wherein the reminder function of the host is to be used for implementing a mobile broadband device service corresponding to the service information, and wherein the mobile broadband device service is implemented directly without calling the reminder function.

* * * * *